United States Patent
Li et al.

(10) Patent No.: US 11,405,939 B2
(45) Date of Patent: Aug. 2, 2022

(54) SCHEDULING REQUEST INDICATION

(71) Applicant: Motorola Mobility LLC, Chicago, IL (US)

(72) Inventors: Hongchao Li, Beijing (CN); Xiaodong Yu, Beijing (CN); Haipeng Lei, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 184 days.

(21) Appl. No.: 16/476,235

(22) PCT Filed: Jan. 5, 2017

(86) PCT No.: PCT/CN2017/070313
§ 371 (c)(1),
(2) Date: Jul. 5, 2019

(87) PCT Pub. No.: WO2018/126405
PCT Pub. Date: Jul. 12, 2018

(65) Prior Publication Data
US 2019/0320446 A1    Oct. 17, 2019

(51) Int. Cl.
*H04W 72/12*    (2009.01)
*H04W 72/14*    (2009.01)

(52) U.S. Cl.
CPC ... *H04W 72/1236* (2013.01); *H04W 72/1252* (2013.01); *H04W 72/1284* (2013.01); *H04W 72/14* (2013.01)

(58) Field of Classification Search
CPC .................................................. H04W 72/12
See application file for complete search history.

(56) References Cited

U.S. PATENT DOCUMENTS

2010/0202420 A1*  8/2010  Jersenius ............... H04J 11/00
                                                        370/337
2013/0182623 A1*  7/2013  Fan ....................... H04W 4/70
                                                        370/311
(Continued)

FOREIGN PATENT DOCUMENTS

CN    102783062 A    11/2012
CN    103929772 A    7/2014

OTHER PUBLICATIONS

PCT/CN2017/070312, "Notification of Transmittal of the International Search Report and the Written Opinion of the International Searching Authority, or the Declaration", International Searching Authority, dated Oct. 11, 2017, pp. 1-11.

*Primary Examiner* — Sulaiman Nooristany
(74) *Attorney, Agent, or Firm* — Kunzler Bean & Adamson

(57) ABSTRACT

Apparatuses, methods, and systems are disclosed for scheduling request indication. One apparatus (200) includes a transmitter (210) that transmits (602) a scheduling request in response to data arriving at a buffer. The scheduling request includes an indication of a traffic type, a requested number of scheduling transmissions, an expected number of transmissions, an expected scheduling interval, a latency requirement, or some combination thereof. The apparatus (200) also includes a receiver (212) that receives (604) an uplink grant in response to transmitting the scheduling request. The transmitter (210) transmits (606) the data in response to receiving the uplink grant.

11 Claims, 7 Drawing Sheets

(56) References Cited

U.S. PATENT DOCUMENTS

| | | |
|---|---|---|
| 2013/0223256 A1 | 8/2013 | Choi et al. |
| 2015/0117342 A1* | 4/2015 | Loehr ............... H04W 72/1284 370/329 |
| 2017/0134236 A1* | 5/2017 | Patel ................... H04W 74/004 |
| 2017/0202009 A1* | 7/2017 | Kim ................... H04W 72/1284 |
| 2018/0139773 A1* | 5/2018 | Ma ........................ H04L 5/0007 |
| 2019/0335448 A1* | 10/2019 | Yang ................. H04W 72/1278 |
| 2020/0084621 A1* | 3/2020 | Jiang .................... H04W 12/04 |

* cited by examiner

SCHEDULING REQUEST INDICATION

FIELD

The subject matter disclosed herein relates generally to wireless communications and more particularly relates to scheduling request indication.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, URLLC may have a data payload that is small. According to some configurations, URLLC may have a periodically occurring packet arrival rate and a packet size may be 32 bytes, 50 bytes, 200 bytes, and so forth.

In certain configurations, for URLLC, the user plane latency may be 0.5 ms for UL, and 0.5 ms for DL. Moreover, URLLC reliability may be evaluated by a success probability of transmitting X bytes within 1 ms. This may be the time it takes to deliver a small data packet from the radio protocol layer 2/3 service data unit ("SDU") ingress point to the radio protocol layer 2/3 SDU egress point of the radio interface, at a certain channel quality (e.g., coverage-edge). In various configurations, the target for reliability may be $1-10^{-5}$ within 1 ms. In certain configurations, a general URLLC reliability requirement for one transmission of a packet may be 1-10-5 for X bytes (e.g., 20 bytes) with a user plane latency of 1 ms.

Various transmission configurations may not facilitate a user plane latency of 1 ms. For example, a grant-based transmission including a scheduling request, a first UL grant, buffer status report ("BSR") reporting, a second UL grant, then data transmission may not facilitate a user plane latency of 1 ms.

BRIEF SUMMARY

Apparatuses for scheduling request indication are disclosed. Methods and systems also perform the functions of the apparatus. In one embodiment, the apparatus includes a transmitter that transmits a scheduling request in response to data arriving at a buffer. In various embodiments, the scheduling request includes an indication of a traffic type, a requested number of scheduling transmissions, an expected number of transmissions, an expected scheduling interval, a latency requirement, or some combination thereof. The apparatus also includes a receiver that receives an uplink grant in response to transmitting the scheduling request. In some embodiments, the transmitter transmits the data in response to receiving the uplink grant.

In one embodiment, the indication indicates a single-shot schedule request with a size of the data below a predetermined threshold. In a further embodiment, the indication indicates a multiple-shot schedule request with a size of the data below a predetermined threshold. In certain embodiments, the indication indicates a periodic transmission schedule request with a predetermined periodicity. In some embodiments, the indication includes two bits that indicate four different states.

In various embodiments, the indication includes one bit that indicates a buffer status report will not be sent. In some embodiments, the transmitter transmits the scheduling request in an uplink control channel. In one embodiment, the transmitter transmits the scheduling request in a physical resource region outside of a control channel. In various embodiments, the transmitter transmits the scheduling request in a spreading sequence space. In some embodiments, the transmitter transmits the data in a grant-free transmission.

A method for scheduling request indication, in one embodiment, includes transmitting a scheduling request in response to data arriving at a buffer. In certain embodiments, the scheduling request includes an indication of a traffic type, a requested number of scheduling transmissions, an expected number of transmissions, an expected scheduling interval, a latency requirement, or some combination thereof. The method also includes receiving an uplink grant in response to transmitting the scheduling request. The method includes transmitting the data in response to receiving the uplink grant.

In one embodiment, an apparatus includes a receiver that receives a scheduling request. In such embodiments, the scheduling request may include an indication of a traffic type, a requested number of scheduling transmissions, an expected number of transmissions, an expected scheduling interval, a latency requirement, or some combination thereof. In various embodiments, the apparatus includes a transmitter that transmits an uplink grant in response to receiving the scheduling request. In some embodiments, the receiver receives data in response to transmitting the uplink grant.

In one embodiment, the indication indicates a single-shot schedule request with a size of data below a predetermined threshold. In a further embodiment, the indication indicates a multiple-shot schedule request with a size of data below a predetermined threshold. In certain embodiments, the indication indicates a periodic transmission schedule request with a predetermined periodicity. In some embodiments, the indication includes two bits that indicate four different states.

In various embodiments, the indication includes one bit that indicates a buffer status report will not be sent. In some embodiments, the receiver receives the scheduling request in an uplink control channel. In one embodiment, the receiver receives the scheduling request in a physical resource region outside of a control channel. In a further embodiment, the receiver receives the scheduling request in a spreading sequence space. In various embodiments, the receiver receives data in a grant-free transmission.

A method for scheduling request indication, in one embodiment, includes receiving a scheduling request. In certain embodiments, the scheduling request includes an indication of a traffic type, a requested number of scheduling transmissions, an expected number of transmissions, an expected scheduling interval, a latency requirement, or some combination thereof. The method also includes transmitting an uplink grant in response to receiving the scheduling request. The method includes receiving data in response to transmitting the uplink grant.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
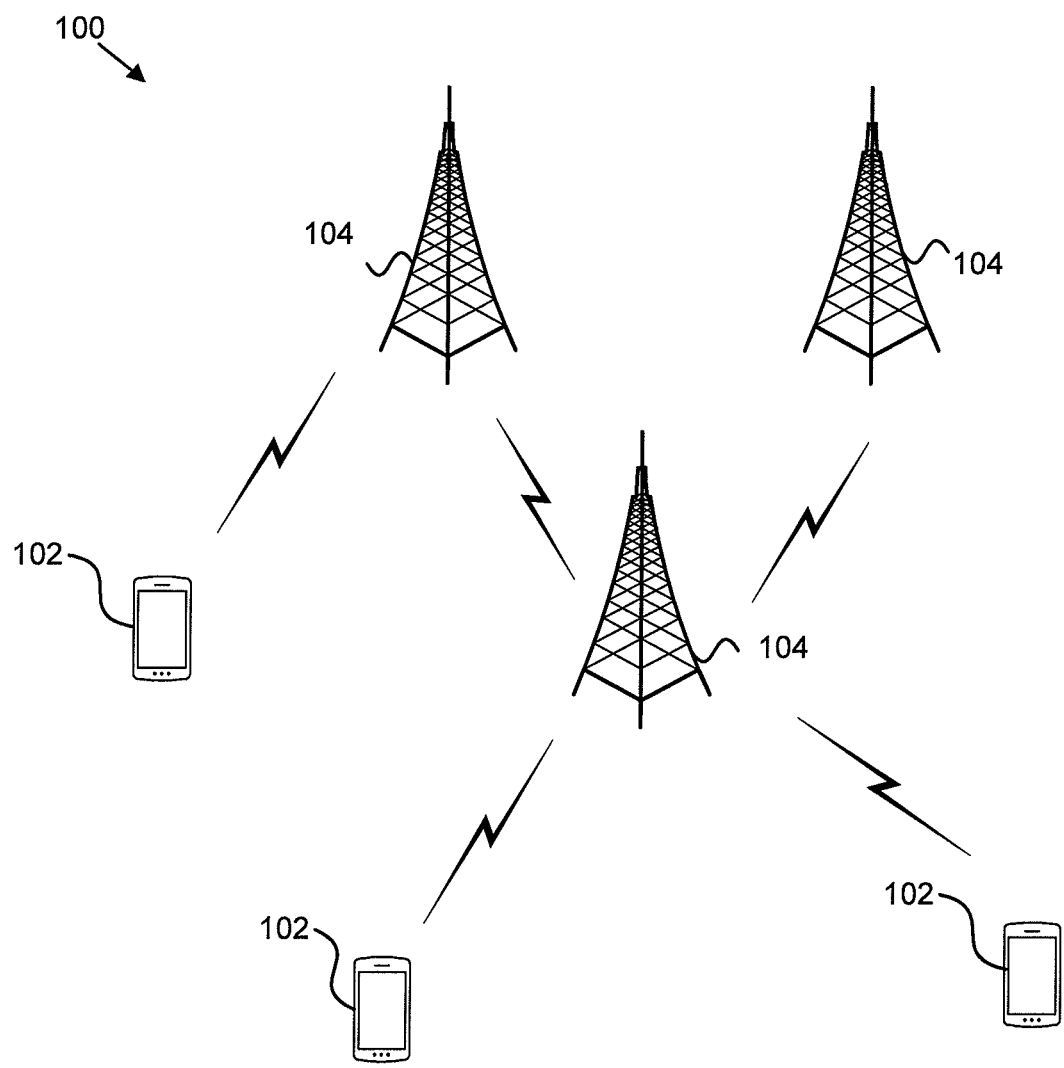
FIG. 1 is a schematic block diagram illustrating one embodiment of a wireless communication system for scheduling request indication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for scheduling request indication. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive a scheduling request in response to data arriving at a buffer of a remote unit 102. The scheduling request may include an indication of a traffic type, a requested number of scheduling transmissions, an expected number of transmissions, an expected scheduling interval, a latency requirement, or some combination thereof. In some embodiments, the base unit 104 may transmit an uplink grant in response to receiving the scheduling request. In certain embodiments, the base unit 104 may receive the data in response to transmitting the uplink grant. Accordingly, a base unit 104 may be used for scheduling request indication.

In another embodiment, a remote unit 102 may transmit a scheduling request in response to data arriving at a buffer. The scheduling request may include an indication of a traffic type, a requested number of scheduling transmissions, an expected number of transmissions, an expected scheduling interval, a latency requirement, or some combination thereof. The remote unit 102 may receive an uplink grant in response to transmitting the scheduling request. The remote unit 102 may transmit the data in response to receiving the uplink grant. Accordingly, a remote unit 102 may be used for scheduling request indication.

Figure 2:
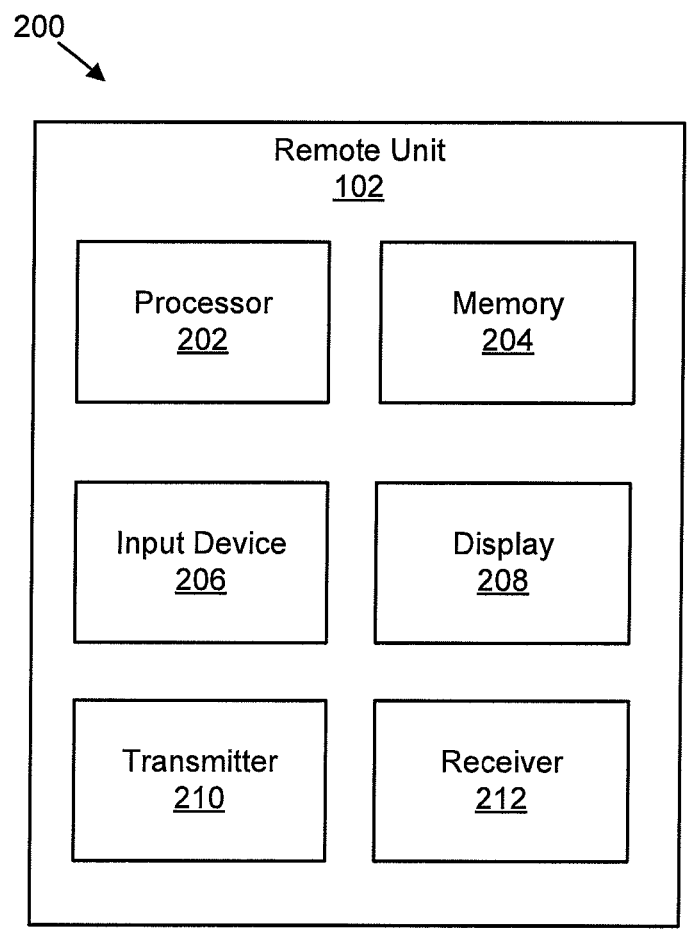
FIG. 2 is a schematic block diagram illustrating one embodiment of an apparatus that may be used for scheduling request indication.

FIG. 2 depicts one embodiment of an apparatus 200 that may be used for scheduling request indication. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an uplink transmission. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device.

The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 may be used to transmit a scheduling request in response to data arriving at a buffer. In certain embodiments, the scheduling request includes an indication of a traffic type, a requested number of scheduling transmissions, an expected number of transmissions, an expected scheduling interval, a latency requirement, or some combination thereof. In one embodiment, the receiver 212 may be used to receive an uplink grant in response to transmitting the scheduling request. In some embodiments, the transmitter 210 may transmit the data in response to receiving the uplink grant. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
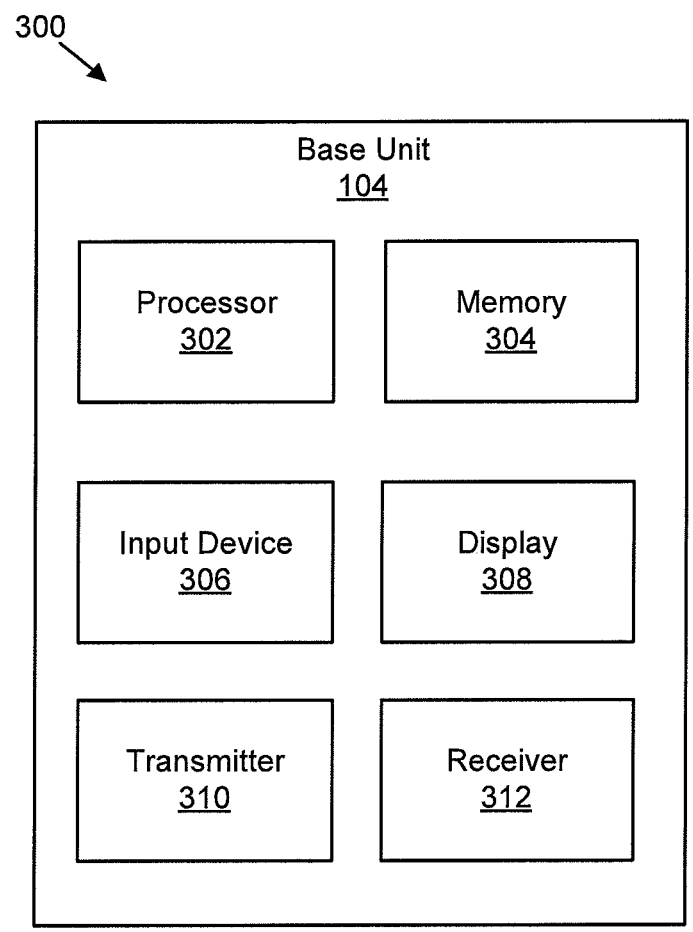
FIG. 3 is a schematic block diagram illustrating one embodiment of an apparatus that may be used for scheduling request indication.

FIG. 3 depicts one embodiment of an apparatus 300 that may be used for scheduling request indication. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the receiver 312 may be used to receive a scheduling request in response to data arriving at a buffer of a remote unit. In certain embodiments, the scheduling request includes an indication of a traffic type, a requested number of scheduling transmissions, an expected number of transmissions, an expected scheduling interval, a latency requirement, or some combination thereof. In various embodiment, the transmitter 310 is used to transmit an uplink grant in response to receiving the scheduling request. In some embodiments, receiver 312 may be used to receive the data in response to transmitting the uplink grant. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
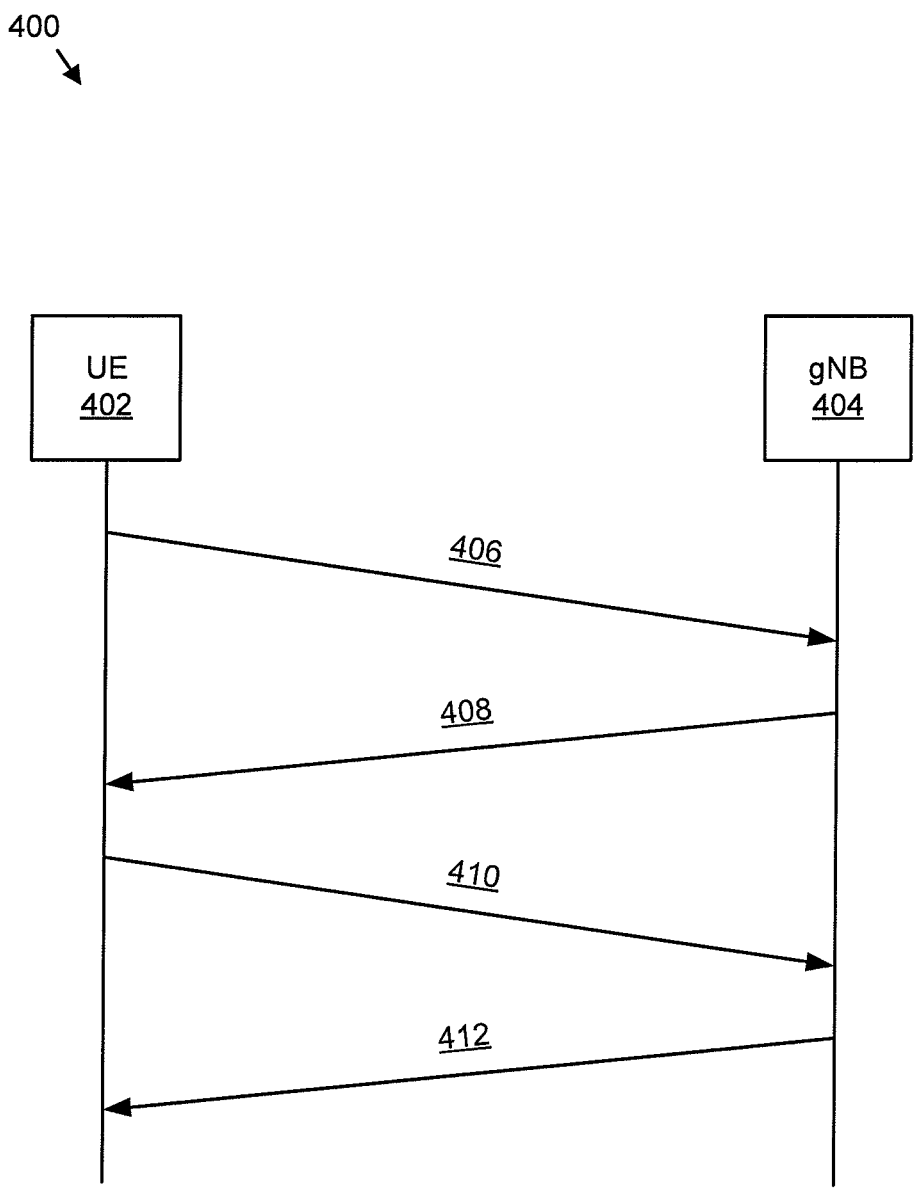
FIG. 4 illustrates one embodiment of communications for scheduling request indication.

FIG. 4 illustrates one embodiment of communications 400 for scheduling request indication. Specifically, communications 400 between a UE 402 and a gNB 404 are illustrated. The communications 400 may facilitate a fast scheduling request method of communication between the UE 402 and the gNB 404.

A first communication 406 may include a message transmitted from the UE 402 to the gNB 404. The first communication 406 may include a fast scheduling request. In some embodiments, the UE 402 may transmit a fast scheduling request in response to new data arriving at the UE's 402 buffer. In various embodiments, the fast scheduling request may be transmitted in response to the new data having a URLLC requirement. The fast scheduling request may include an indication used to: request a single-shot schedule (e.g., single transmission) with a BSR size below a first threshold within N us; request a multiple-shot (e.g., M number of transmissions) schedule with each transmission having a BSR size below a second threshold within N us; request a multiple-shot (e.g., M) schedule with a BSR size below a third threshold within N us; request scheduling for periodic transmission with a periodicity of T1; or request scheduling for periodic transmission with a periodicity of T2. In certain embodiments, the first threshold, the second threshold, the third threshold, N, M, T1 and/or T2 may be configurable via the gNB 404 and/or may be preconfigured.

The fast scheduling request may include, in certain embodiments, two bits used to indicate four different states (e.g., a single-shot schedule, a multiple-shot schedule, scheduling for periodic transmission, etc.). In various embodiments, the fast scheduling request may include one bit used to indicate a fast scheduling request for URLLC that has specific latency requirements. The one bit may be used to indicate that the UE 402 does not report BSR and the gNB 404 will not look for the BSR before scheduling the UE 402.

The fast scheduling request may be transmitted in an UL control channel with a short format, a physical resource region separate from a control channel used for an eMBB scheduling request and UCI, or a spreading sequence space that is different from one used for an eMBB scheduling request and UCI.

In response to the first communication 406, a second communication 408 may include a message transmitted from the gNB 404 to the UE 402. The second communication 408 may include an UL grant.

In response to the second communication 408, a third communication 410 may include UL data transmitted from the UE 402 to the gNB 404. In response to the third communication 410, a fourth communication 412 may include a message transmitted from the gNB 404 to the UE 402. The fourth communication 412 may include one or more ACK/NACK.

Figure 5:
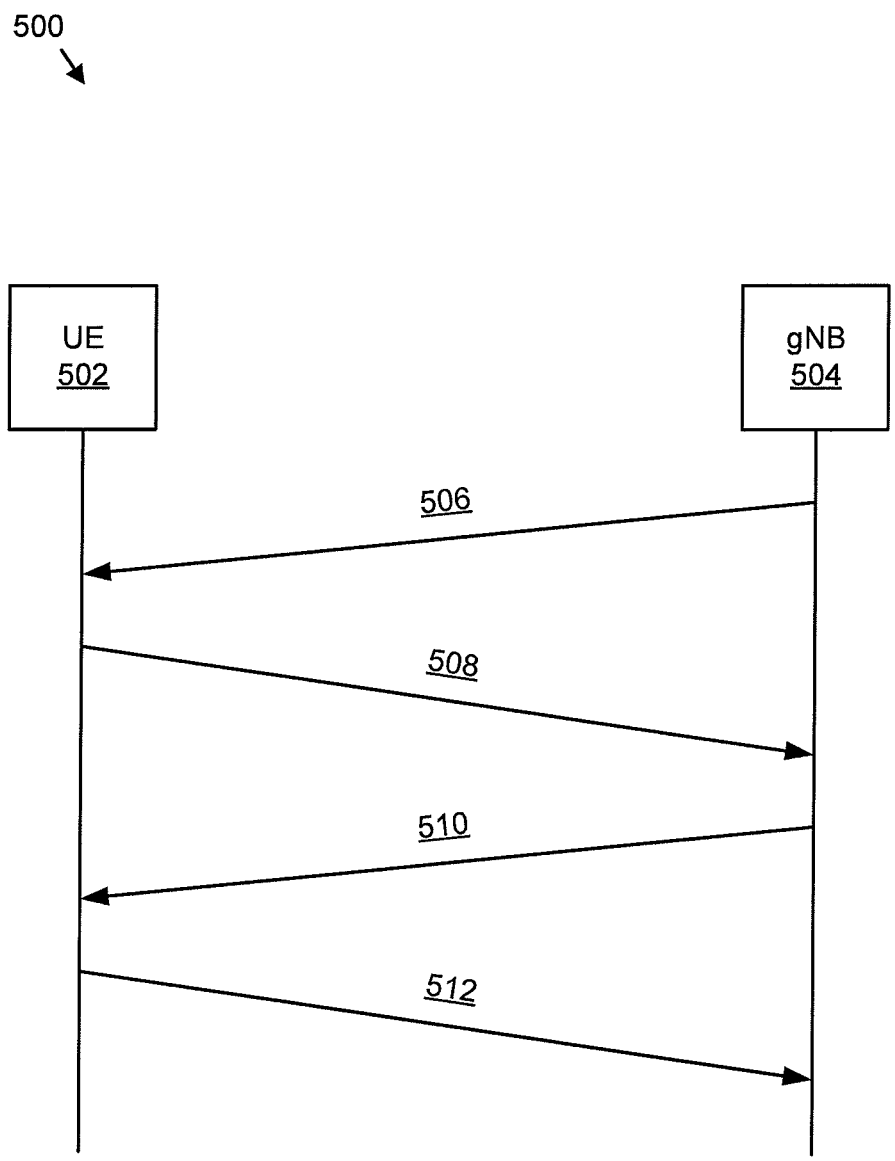
FIG. 5 illustrates another embodiment of communications for scheduling request indication.

FIG. 5 illustrates another embodiment of communications 500 for scheduling request indication. Specifically, communications 500 between a UE 502 and a gNB 504 are illustrated. The communications 500 may facilitate a fast scheduling request method of communication between the UE 502 and the gNB 504.

A first communication 506 may include a message transmitted from the gNB 504 to the UE 502. The first communication 506 may include configuration information for grant-free transmission.

In response to the first communication 506, a second communication 508 may include a message transmitted from the UE 502 to the gNB 504. The second communication 508 may include a grant-free transmission including a fast scheduling request. The second communication 508 may include a fast scheduling request. In some embodiments, the UE 502 may transmit a fast scheduling request in response to new data arriving at the UE's 502 buffer. In various embodiments, the fast scheduling request may be transmitted in response to the new data having a URLLC requirement. The fast scheduling request may include an indication used to: request a single-shot schedule (e.g., single transmission) with a BSR size below a first threshold within N us; request a multiple-shot (e.g., M number of transmissions) schedule with each transmission having a BSR size below a second threshold within N us; request a multiple-shot (e.g., M) schedule with a BSR size below a third threshold; request scheduling for periodic transmission with a periodicity of T1; or request scheduling for periodic transmission with a periodicity of T2. In certain embodiments, the first threshold, the second threshold, the third threshold, N, M, T1 and/or T2 may be configurable via the gNB 404 and/or preconfigured.

The fast scheduling request may include, in certain embodiments, two bits used to indicate four different states (e.g., a single-shot schedule, a multiple-shot schedule, scheduling for periodic transmission, etc.). In various embodiments, the fast scheduling request may include one bit used to indicate a fast scheduling request for URLLC that has specific latency requirements. The one bit may be used to indicate that the UE 502 does not report BSR and the gNB 504 will not look for the BSR before scheduling the UE 502.

The fast scheduling request may be transmitted in an UL control channel with a short format, a physical resource region separate from a control channel used for an eMBB scheduling request and UCI, or a spreading sequence space that is different from one used for an eMBB scheduling request and UCI.

In response to the second communication 508, a third communication 510 may include a message from the gNB 504 to the UE 502. The third communication 510 may include an UL grant which may activate semi-persistent scheduling ("SPS") and/or reserve dedicated resources. In response to the third communication 510, a fourth communication 512 may include data transmitted from the UE 502 to the gNB 504.

Figure 6:
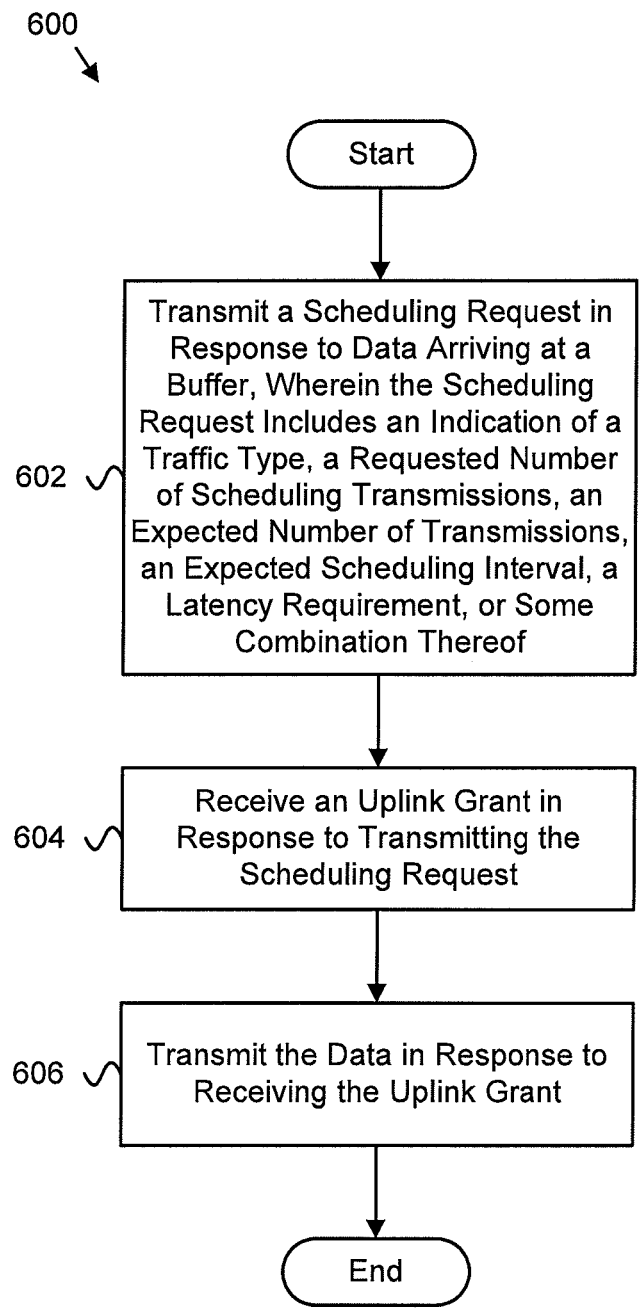
FIG. 6 is a schematic flow chart diagram illustrating one embodiment of a method for scheduling request indication.

FIG. 6 is a schematic flow chart diagram illustrating one embodiment of a method 600 for scheduling request indication. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a scheduling request in response to data arriving at a buffer. The scheduling request may include an indication of a traffic type (e.g., UL or DL), a requested number of scheduling transmissions (e.g., for grant based transmissions), an expected number of transmissions (e.g., for grant-free based transmissions), an expected scheduling interval (e.g., an interval for periodic transmissions), a latency requirement (e.g., in number of ms), or some combination thereof. In some embodiments, the traffic type may indicate in the scheduling request that the data in the buffer is a service or traffic having specific requirements (e.g., in terms of latency and/or reliability) or another feature (e.g., power efficiency, coverage enhancement requirement, etc.). The method 600 also includes receiving 604 an uplink grant in response to transmitting the scheduling request. In one embodiment, the method 600 includes transmitting 606 the data in response to receiving the uplink grant.

In one embodiment, the indication indicates a single-shot schedule request with a size of the data below a predetermined threshold. The predetermined threshold may be preconfigured and/or configured via signaling. In a further embodiment, the indication indicates a multiple-shot schedule request with a size of the data below a predetermined threshold. In certain embodiments, the indication indicates a periodic transmission schedule request with a predetermined periodicity. The predetermined periodicity may be preconfigured and/or configured via signaling. In some embodiments, the indication includes two bits that indicate four different states.

In various embodiments, the indication includes one bit that indicates a buffer status report will not be sent. In some embodiments, the method 600 includes transmitting the scheduling request in an uplink control channel. In one embodiment, the method 600 includes transmitting the scheduling request in a physical resource region outside of a control channel. In various embodiments, the method 600 includes transmitting the scheduling request in a spreading sequence space. In some embodiments, the method 600 includes transmitting the data in a grant-free transmission.

Figure 7:
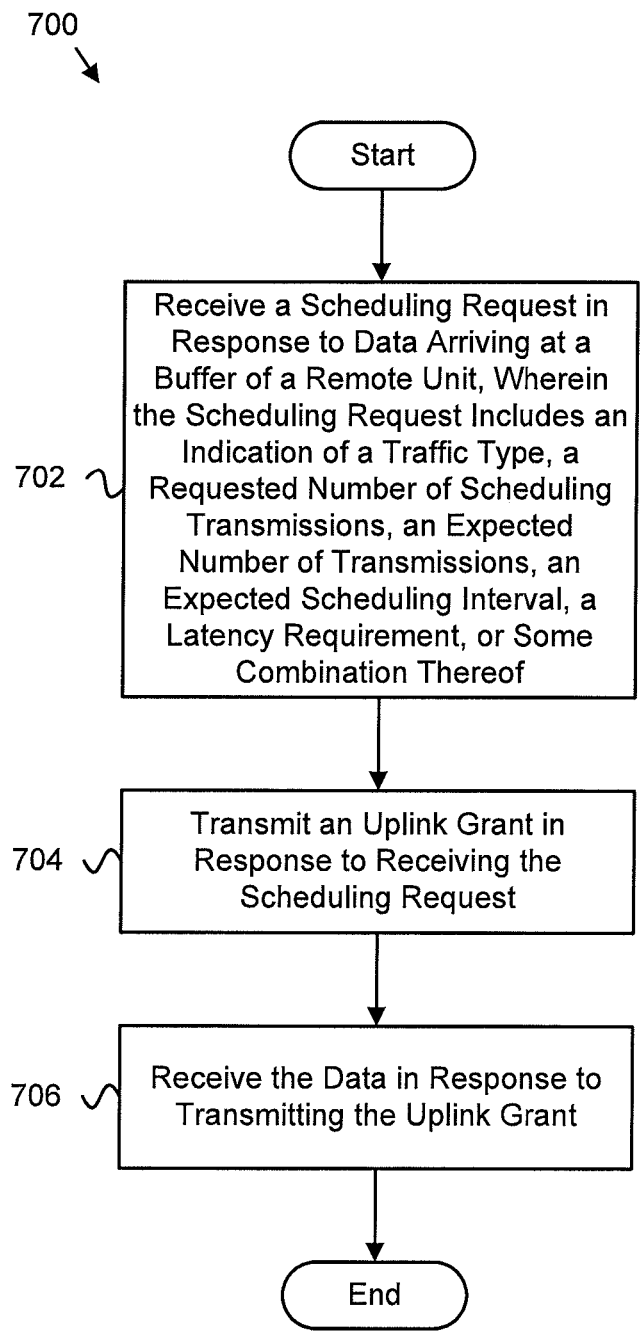
FIG. 7 is a schematic flow chart diagram illustrating another embodiment of a method for scheduling request indication.

FIG. 7 is a schematic flow chart diagram illustrating one embodiment of a method 700 for scheduling request indication. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a scheduling request in response to data arriving at a buffer of a remote unit. In certain embodiments, the scheduling request includes an indication of a traffic type, a requested number of scheduling transmissions, an expected number of transmissions, an expected scheduling interval, a latency requirement, or some combination thereof. The method 700 also includes transmitting 704 (an uplink grant in response to receiving the scheduling request. The method 700 includes receiving 706 the data in response to transmitting the uplink grant.

In one embodiment, the indication indicates a single-shot schedule request with a size of the data below a predetermined threshold. In a further embodiment, the indication indicates a multiple-shot schedule request with a size of the data below a predetermined threshold. In certain embodiments, the indication indicates a periodic transmission schedule request with a predetermined periodicity. In some embodiments, the indication includes two bits that indicate four different states.

In various embodiments, the indication includes one bit that indicates a buffer status report will not be sent. In some embodiments, the method 700 includes receiving the scheduling request in an uplink control channel. In one embodiment, the method 700 includes receiving the scheduling request in a physical resource region outside of a control channel. In a further embodiment, the method 700 includes receiving the scheduling request in a spreading sequence space. In various embodiments, the method 700 includes receiving the data in a grant-free transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
 a transmitter that transmits a scheduling request in response to data arriving at a buffer, wherein the scheduling request comprises a two bit indicator that indicates a group of states consisting of:
  a first indication indicating a request for single-transmission scheduling in response to a size of the data in the buffer being below a first threshold;
  a second indication indicating a request for multiple-transmission scheduling in response to the size of the data in the buffer being below a second threshold; and
  a third indication indicating a request for a periodic transmission having a determined periodicity; and
 a receiver that receives an uplink grant in response to transmitting the scheduling request, wherein the transmitter transmits the data in response to receiving the uplink grant.

2. The apparatus of claim 1, wherein the transmitter transmits the scheduling request in an uplink control channel.

3. The apparatus of claim 1, wherein the transmitter transmits the scheduling request in a physical resource region outside of a control channel used for an enhanced mobile broadband scheduling request and outside of a control channel used for uplink control information.

4. The apparatus of claim 1, wherein the transmitter transmits the scheduling request in a spreading sequence space different from a spreading sequence space used for an enhanced mobile broadband scheduling request and different from a spreading sequence space used for uplink control information.

5. The apparatus of claim 1, wherein the transmitter transmits the data in a grant-free transmission.

6. A method comprising:
 transmitting a scheduling request in response to data arriving at a buffer, wherein the scheduling request comprises a two bit indicator that indicates a group of states consisting of:
  a first indication indicating a request for single-transmission scheduling in response to a size of the data in the buffer being below a first threshold;
  a second indication indicating a request for multiple-transmission scheduling in response to the size of the data in the buffer being below a second threshold; and
  a third indication indicating a request for a periodic transmission having a determined periodicity;
 receiving an uplink grant in response to transmitting the scheduling request; and
 transmitting the data in response to receiving the uplink grant.

7. The method of claim 6, wherein the indication indicates a single-shot schedule request with the size of the data below a predetermined threshold.

8. The method of claim 6, wherein the indication indicates a multiple-shot schedule request with the size of the data below a predetermined threshold, wherein the multiple-shot schedule request comprises a request for multiple transmissions.

9. The method of claim 6, wherein the indication indicates a periodic transmission schedule request with a predetermined periodicity.

10. The method of claim 6, wherein the indication comprises two bits that indicate four different states, and each state of the four different states indicates a type of scheduling requested.

11. The method of claim 6, wherein the indication comprises one bit that indicates a buffer status report will not be sent.

* * * * *